United States Patent Office 3,501,474
Patented Mar. 17, 1970

3,501,474
CERTAIN 1,3,4,5-TETRAHYDRO-2H-1,4-BENZODIAZEPIN-2-ONES
Rodney Ian Fryer, North Caldwell, and Leo Henryk Sternbach, Upper Montclair, N.J., assignors to Hoffmann-La Roche, Inc., Nutley, N.J., a corporation of New Jersey
No Drawing. Continuation-in-part of application Ser. No. 357,295, Apr. 3, 1964. This application Apr. 22, 1968, Ser. No. 723,296
Int. Cl. C07d *53/06, 29/26;* A61k *27/00*
U.S. Cl. 260—239.3      1 Claim

ABSTRACT OF THE DISCLOSURE

The preparation of a compound of the formula

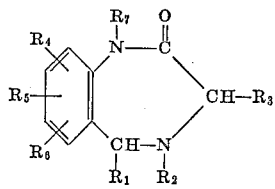

wherein $R_1$ is selected from the group consisting of hydrogen, lower alkyl, phenyl, and halophenyl;
$R_2$ is selected from the group consisting of hydrogen, lower alkyl, benzyl and substituted benzyl; $R_3$ is selected from the group consisting of hydrogen and lower alkyl and $R_4$, $R_5$ and $R_6$ are selected from the group consisting of lower alkoxy, lower alkyl and hydrogen
is described. These compounds are useful as anticonvulsants, muscle relaxants and sedative agents.

RELATED CASE

This application is a continuation-in-part of application Ser. No. 357,295, filed on Apr. 3, 1964, in the names of Rodney Ian Fryer and Leo Henryk Sternbach, now abandoned. The benefit of the filing date of this earlier-filed application is hereby requested.

DETAILED DESCRIPTION OF THE INVENTION

The present invention relates to novel benzodiazepines, to a novel process for preparing such novel benzodiazepines as well as to other known benzodiazepines and to intermediate 4-isoquinolone oximes useful in the performance of the said novel process.

The novel process aspect of the present invention comprehends the reaction of compounds of the formula

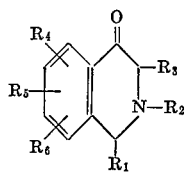

wherein $R_1$ is selected from the group consisting of hydrogen, lower alkyl, phenyl and halophenyl;
$R_2$ is selected from the group consisting of hydrogen, lower alkyl, benzyl and substituted benzyl; $R_3$ is selected from the group consisting of hydrogen and lower alkyl and $R_4$, and $R_5$ and $R_6$ are selected from the group consisting of lower alkoxy, lower alkyl and hydrogen with hydroxylamine whereby to form a compound having the formula of

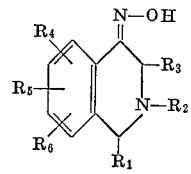

wherein $R_1$, $R_2$, $R_3$, $R_4$, $R_5$ and $R_6$ are as above
and the subsequent treatment of the so-formed oxime of Formula II above with a substantially anhydrous acid agent, e.g., a strong mineral acid (polyphosphoric acid or concentrated sulfuric acid), phosphorus trichloride in ether, acid chlorides (thionyl chloride, phenyl sulfonyl chloride, picryl chloride), acetic anhydride and the like whereby ring enlargement to a benzodiazepine of the formula

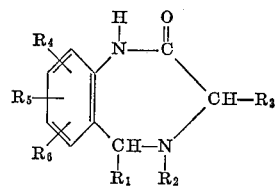

occurs.

The first phase of the reaction, i.e. the conversion of a compound of the Formula I above to the corresponding compound of Formula II above is preferably effected in the presence of an inert organic solvent which may be a lower alkanol such as methanol or ethanol, ethers, such as ethyl ether, tetrahydrofuran, pyridine and the like. The reaction may be effected at room temperature and atmospheric pressure or at elevated temperatures and/or elevated pressures. While, as is evident from the above, temperature and pressure are not critical, it is preferred to operate in a temperature range of from about 60° C. to about 120° C.

The second phase of the reaction, i.e., the conversion of compounds of Formula II above to compounds of Formula III above, may be effected employing the said acid agent in excess and thus, it can function as the reaction media. In the alternative, a conventional inert organic solvent such as benzene and the like can be used as the reaction media. The second phase of the reaction is advantageously effected at elevated temperatures, e.g., in the range of from about 100° C. to about 140° C.

Compounds of Formula I above wherein $R_2$ is a benzyl group or a substituted benzyl group can be debenzylated by conventional debenzylating techniques, e.g., hydrogenation preferably in the presence of a conventional hydrogenation catalyst such as platinum and the like prior to treatment with hydroxylamine whereby to form the corresponding compound wherein $R_2$ is hydrogen. The resultant compound i.e., a compound of Formula I above wherein $R_2$ is hydrogen, can then be reacted with hydroxylamine to form the corresponding oxime of Formula II above.

The last-mentioned oxime can be ring enlarged to the corresponding benzodiazepine in the manner set out above. On the other hand, a compound corresponding to Formula I above wherein $R_2$ is benzyl or substituted benzyl can be first reacted with hydroxylamine to form the corresponding compound of Formula II above and the resultant compound can be treated in the manner set out above whereby to effect ring enlargement to a benzodiazepine corresponding to Formula III above wherein $R_2$ is benzyl or a substituted benzyl group. The so-formed compound can then be debenzylated, if desired, to the corresponding compound of Formula III above wherein $R_2$ is hydrogen. Compounds corresponding to Formula III above wherein at least one of $R_4$ and $R_5$ and $R_6$ is lower alkyloxy, and $R_2$ is other than hydrogen, are novel. Such compounds are useful as anticonvulsants, muscle relaxants and sedatives.

Accordingly, the novel benzodiazepines of the present invention have the formula

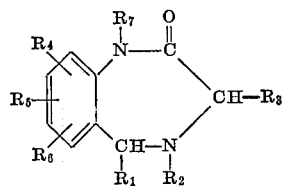

IV wherein $R_1$ is selected from the group consisting of hydrogen, lower alkyl, phenyl and halophenyl; $R_2$ is selected from the group consisting of lower alkyl, benzyl and substituted benzyl; $R_3$ is selected from the group consisting of hydrogen and lower alkyl; $R_4$, $R_5$ and $R_6$ are selected from the group consisting of lower alkoxy, lower alkyl and hydrogen and $R_7$ is selected from the group consisting of hydrogen and lower alkyl at least one of $R_4$, $R_5$ or $R_6$ being lower alkoxy.

Compounds of Formula IV above wherein $R_7$ is lower alkyl can be prepared from the corresponding compounds of Formula IV above wherein $R_7$ is hydrogen by alkylating such compounds. The alkylation can proceed, for example, by forming the sodio derivative of compounds corresponding to Formula IV above wherein $R_7$ is hydrogen with sodium hydride or a sodium alkylate such as sodium methoxide in an inert organic solvent such as toluene and then reacting the so-formed sodio derivative with, for example, dialkyl sulfate or an alkyl halide in an inert solvent, for example, a hydrocarbon or dimethylformamide. Suitable dialkyl sulfates may be represented by dimethyl sulfate. Similarly, suitable alkyl halides may be represented by methyl iodide.

Also encompassed within the purview of the present invention are the pharmaceutically acceptable acid addition salts of compounds of Formula IV above. The compounds of Formula IV above form pharmaceutically acceptable acid addition salts with pharmaceutically acceptable acids, for example, with inorganic and organic acids such as hydrochloric acid, hydrobromic acid, sulfuric acid, phosphoric acid, nitric acid, citric acid, tartaric acid, salicylic acid, toluene-sulfonic acid, ascorbic acid, maleic acid, succinic acid, formic acid, acetic acid and the like.

Compounds of Formula IV above can be administered internally, for example, parenterally, or enterally in conventional pharmaceutical dosage forms. For example, they can be employed in conventional liquid or solid vehicles to provide elixirs, suspensions, tablets, capsules, powders and the like according to acceptable pharmaceutical practices.

The expression "lower alkyl" as utilized throughout the instant specification and claims, is intended to connote both straight and branched chain lower alkyl groups such as methyl, ethyl, propyl, isopropyl, butyl and the like. The expression "substituted benzyl" represents a benzyl group substituted in the α-position with a lower alkyl group, e.g., α-methylbenzyl or a benzyl group substituted in the phenyl nucleus with a substituent such as lower alkyl, halo and the like.

The starting compounds of Formula I above can be prepared according to the techniques specified in application Ser. No. 357,318, filed in the name of John Thaddeus Gibas, Hsi Lin Lee and Wilhelm Wenner on Apr. 3, 1964, now abandoned.

The following examples are illustrative but not limitative of the present invention. All temperatures stated are in degrees centigrade.

EXAMPLE 1

A mixture of 1.0 g. of 1,2-dihydro-7-methoxy-2-methyl-1-phenyl-4(3H)-isoquinolone, 1.0 g. of hydroxylamine hydrochloride, 2.0 g. of hydrated sodium acetate, 10 ml. of water and 20 ml. of ethanol were heated under reflux for ½ hour. A precipitate formed upon cooling the mixture and the resultant precipitate was separated by filtration. The precipitate was recrystallized from a mixture of dioxane and water (1/1 v./v.) to give 1,2-dihydro-7-methoxy - 2-methyl-1-phenyl-4(3H) - isoquinolone oxime, M.P. 211–214°.

EXAMPLE 2

A mixture of 500 mg. of 1,2-dihydro-7-methoxy-2-methyl-1-phenyl-4(3H)-isoquinolone oxime and 10 g. of polyphosphoric acid was carefully heated to 130° and maintained approximately at this temperature for 10 minutes. The reaction mixture was treated with 300 g. of ice and made basic with ammonium hydroxide. A precipitate which formed was removed by filtration. The precipitate was dissolved in dioxane and filtered through 5 g. of neutral activated alumina. The solvent was removed under reduced pressure. The residual oil was dissolved in 50 ml. of dichloromethane and the resultant solution was then extracted with 3 N hydrochloric acid (3×25 ml.). The acid extracts were combined, made basic with ammonium hydroxide and extracted with dichloromethane (3×20 ml.). The dichloromethane extracts were combined, washed with water (2×10 ml.). dried with anhydrous sodium sulfate, filtered and evaporated. The residue was recrystallized from dichloromethane to give 7-methoxy-4-methyl - 5 - phenyl-1,3,4,5 - tetrahydro - 2H-1,4-benzodiazepin-2-one, M.P. 214–215°.

EXAMPLE 3

A mixture of 10.0 g. of 2 - benzyl - 1,2 - dihydro-7-methoxy-4(3H)-isoquinolone, 10.0 g. of hydroxylamine hydrochloride, 20.0 g. of sodium acetate hydrate, 100 ml. of water and 200 ml. of ethanol were heated under reflux for ½ hour. A precipitate formed upon cooling the mixture. The precipitate was filtered off to give 2-benzyl-1,2-dihydro-7-methoxy-4(3H)-isoquinolone oxime, M.P. 189–192°. Upon recrystallization from an aqueous dioxane solution, it was found to have a melting point of 192–194°.

What is claimed is:
1. A compound of the formula

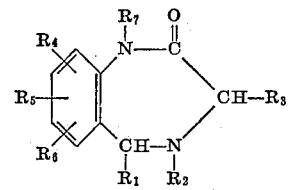

wherein $R_1$ is selected from the group consisting of hydrogen, lower alkyl, phenyl and halophenyl; $R_2$ is selected from the group consisting of benzyl and benzyl substituted in the α-position with lower alkyl or on the phenyl ring with halogen and lower alkyl; $R_3$ is selected from the group consisting of hydrogen and lower alkyl; $R_4$, $R_5$ and $R_6$ are each selected from the group consisting of lower alkoxy, lower alkyl and hydrogen; and $R_7$ is selected from the group consisting of hydrogen and lower alkyl at least one of $R_4$, $R_5$ or $R_6$ being lower alkoxy.

References Cited

UNITED STATES PATENTS

| 2,487,246 | 11/1949 | Johnson et al. | 260—239.3 |
| 3,197,505 | 7/1965 | Jori. | |
| 3,243,427 | 3/1966 | Reeder et al. | 260—239.3 |
| 3,270,053 | 8/1966 | Reeder et al. | 260—239.3 |

FOREIGN PATENTS 6,504,208　10/1965　Netherlands.

OTHER REFERENCES

Fieser and Fieser "Advanced Organic Chemistry," pp. 432–441 (Reinhold) (1961).

Hine, "Physical Organic Chemistry," 2nd ed. (McGraw-Hill) (1962).

HENRY R. JILES, Primary Examiner

R. T. BOND, Assistant Examiner

U.S. Cl. X.R.

260—288, 289; 424—244